March 31, 1970 R. S. BAKER 3,504,066
METHOD OF FORMING PRESTRESSED CONCRETE ARTICLES
Original Filed Feb. 11, 1964                                6 Sheets-Sheet 1

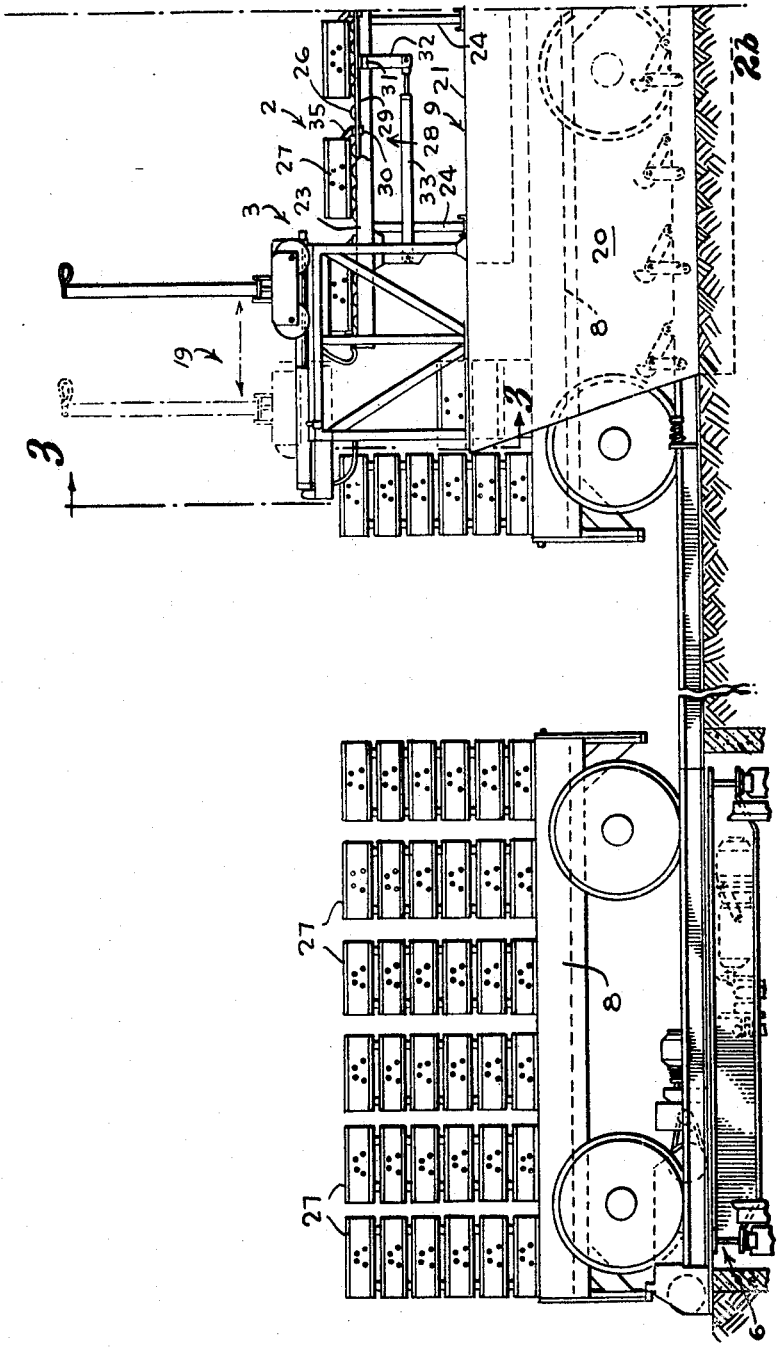

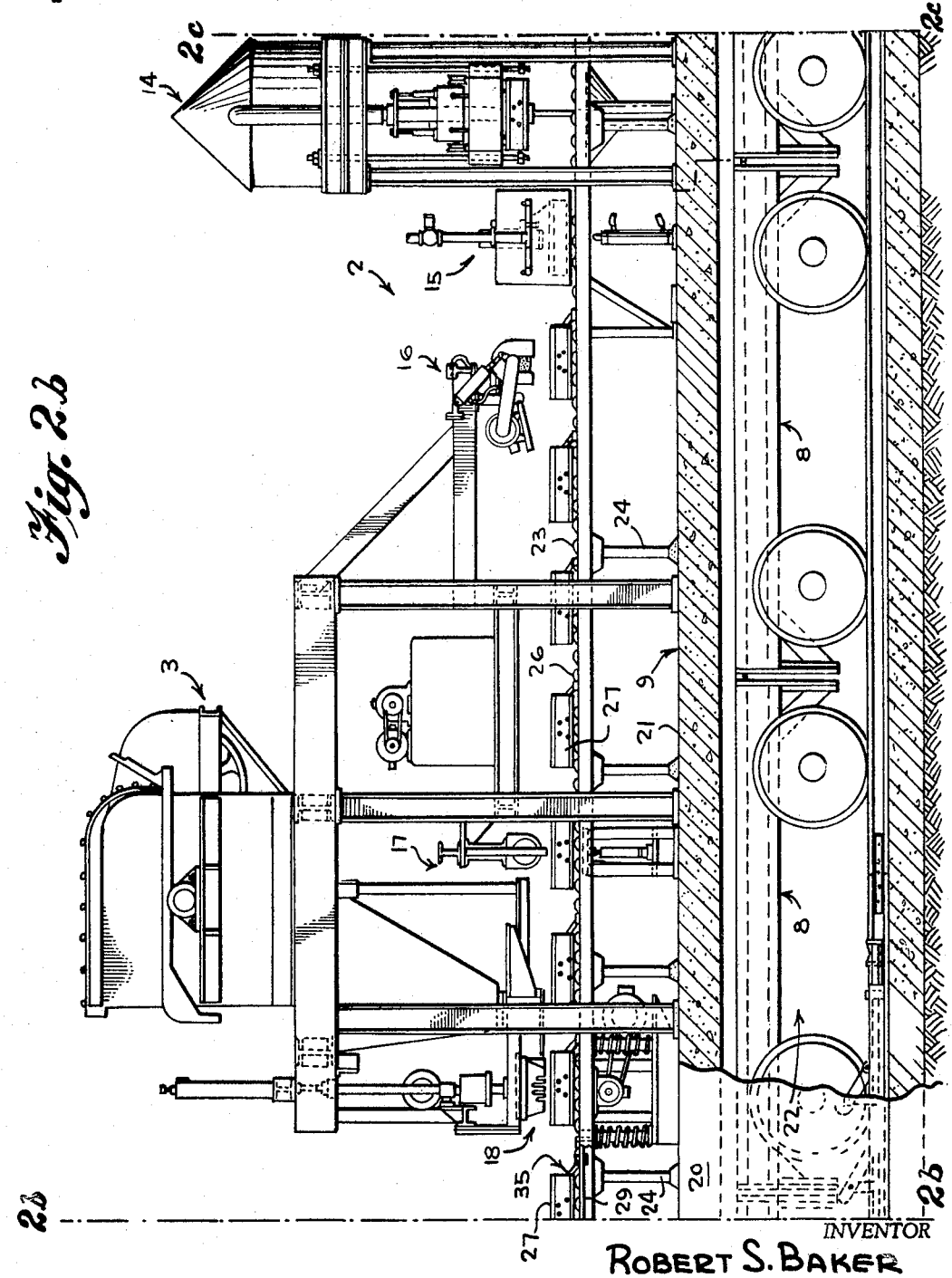

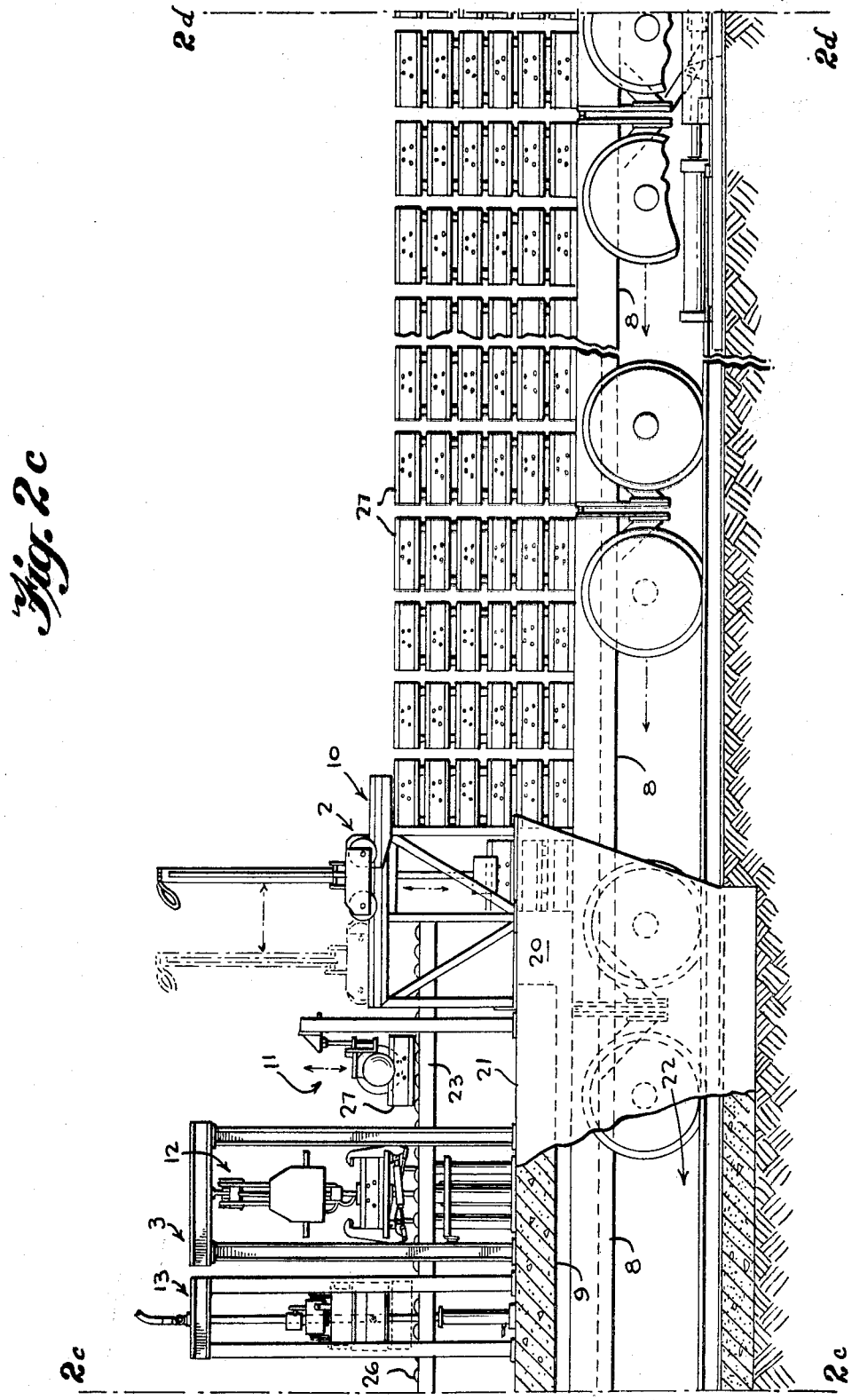

March 31, 1970 R. S. BAKER 3,504,066
METHOD OF FORMING PRESTRESSED CONCRETE ARTICLES
Original Filed Feb. 11, 1964 6 Sheets-Sheet 5

INVENTOR
ROBERT S. BAKER

BY Mason, Fenwick & Lawrence
ATTORNEYS

United States Patent Office 3,504,066
Patented Mar. 31, 1970

3,504,066
METHOD OF FORMING PRESTRESSED CONCRETE ARTICLES
Robert S. Baker, Temple Terrace, Fla., assignor, by mesne assignments, to American Concrete Crosstie Corporation, Tampa, Fla., a corporation of Florida
Application Feb. 27, 1967, Ser. No. 618,743, now Patent No. 3,384,939, dated May 28, 1968, which is a division of application Ser. No. 344,095, Feb. 11, 1964, now Patent No. 3,305,907, dated Feb. 28, 1967. Divided and this application Feb. 26, 1968, Ser. No. 708,135
The portion of the term of the patent subsequent to Feb. 28, 1984, has been disclaimed
Int. Cl. B28d 1/08, 21/60
U.S. Cl. 264—39   3 Claims

ABSTRACT OF THE DISCLOSURE

A method of forming prestressed concrete articles in inverted position in a pallet wherein the pallet is moved along a path to a plurality of stations where the pallet is cleaned, oiled, stressing cables laid across the pallet, the cables stressed and held stressed by the pallets. The pallet is then moved to a molding position where the concrete is poured, compressed and vibrated. The pallet with the formed article is removed from the path for curing, then returned and the article removed and turned to proper position. Apparatus for performing the method is disclosed generally.

CROSS REFERENCE TO RELATED APPLICATIONS

This application is a division of co-pending application of Robert S. Baker, Ser. No. 618,743, filed Feb. 27, 1967, now Patent No. 3,384,939 for Closed Path Concrete Forming and Curing Apparatus, which application, in turn, was a division of an application of Robert S. Baker, Ser. No. 344,095, filed Feb. 11, 1964, for Machine for Making Prestressed Concrete Members, now Patent No. 3,305,907, dated Feb. 28 1967.

BACKGROUND OF THE INVENTION

In co-pending application, Ser. No. 844,441 filed Oct. 5, 1959, now Patent No. 3,128,521 issued Apr. 14, 1964, and entitled "Apparatus for Molding Prestressed Concrete Members," there is disclosed a machine for making prestressed concrete railroad ties, wherein pallets of particular construction are loaded onto the machine, oriented relative to the machine, and carried through a plurality of operating stations. The pallet is a self-contained unit having means for receiving stressing cables and holding them stressed while the concrete member is poured and cured. The several stations through which the pallets pass allow cables to be placed in, and attached to, the pallets, the cables tensioned, concrete poured and compacted on the pallet, and the pallet with its finished member of green concrete and the cables held under tension is removed from the machine.

This invention relates to a method of forming prestressed articles in pallets, wherein the pallets are moved from station to station in succession.

In prior Patent No. 3,128,521, issued Apr. 14, 1964, entitled Apparatus for Molding Prestressed Concrete Members, there is disclosed a machine for making prestressed concrete railroad ties, wherein pallets of particular construction are loaded onto the machine, oriented relative to the machine, and, after movement to a molding position, have the stressing cables laid and stressed prior to pouring. The pallet is a self-contained unit having means for receiving the stressing cables and holding them stressed while the concrete member is poured and cured. The parent application of the present case, Patent No. 3,305,907, disclosed the present method of moving pallets from station to station along the path and performing the several operations. It also disclosed in detail apparatus for carrying out the method, and the apparatus is claimed therein. The later patent can be referred to for details of the apparatus generally described herein.

SUMMARY OF THE INVENTION

The principal object of the present invention is to provide a method by which pallets having self-contained means for holding cables in stressed condition may receive the cables, have them stressed, the concrete poured, compressed and vibrated, the concrete article cured and then removed from the pallet.

Another object is the provision of such a method wherein the pallet is cleaned and oiled after removal of the concrete article and before receiving a fresh set of stressing cables.

It is also an object of the invention to provide a method of forming prestressed concrete articles in pallets wherein the article is formed in an inverted position and is turned to upright position after curing and removal from the pallet.

Other objects of the invention will become apparent from the following description of one practical embodiment thereof when taken in conjunction with the drawings which accompany, and form part of, this specification.

BRIEF DESCRIPTION OF THE DRAWINGS

FIGURES 2A, 2B, 2C and 2D, together show a section taken on the line 2—2 of FIGURE 1 and illustrate on an enlarged scale in side elevation the means for transporting the pallet along a concrete member forming machine to the various stations in accordance with the present method.

DESCRIPTION OF THE PREFERRED EMBODIMENT

In general, the method of the present invention includes the steps of moving a pallet having self-contained means for holding cables while stressed through a number of stations where various operations are performed.

In accordance with the method, a pallet is moved to a station where lengths of cable are laid across it and threaded into anchor openings in the ends, and then moved to a station where the cables are tensioned to predetermined degree and held under tension by anchors on the pallet. The pallet is then moved to the molding position where the concrete is poured, the upper mold section comes down on top of the pallet to compress and shape the concrete article, and the pallet and article are vibrated to settle and condense the concrete. After removal of the upper section of the mold, the pallet with its formed article is taken to a curing place so that the concrete can set. After curing sufficiently for the article to withstand the stress of the cables, the pallet is moved to a station where the cables are cut free from the pallet so as to release their tension to the concrete article to stress it. The article is removed from the pallet and turned over so that it will occupy its normal, upright position. The pallet is then moved to a station, or stations, where it is cleaned and oiled preparatory for beginning a new cycle of movement.

Apparatus for carrying out the method is shown generally in the accompanying drawings, but prior Patent No. 3,305,907 may be referred to for details of structure at any of the several stations of the machine.

Figure 1:
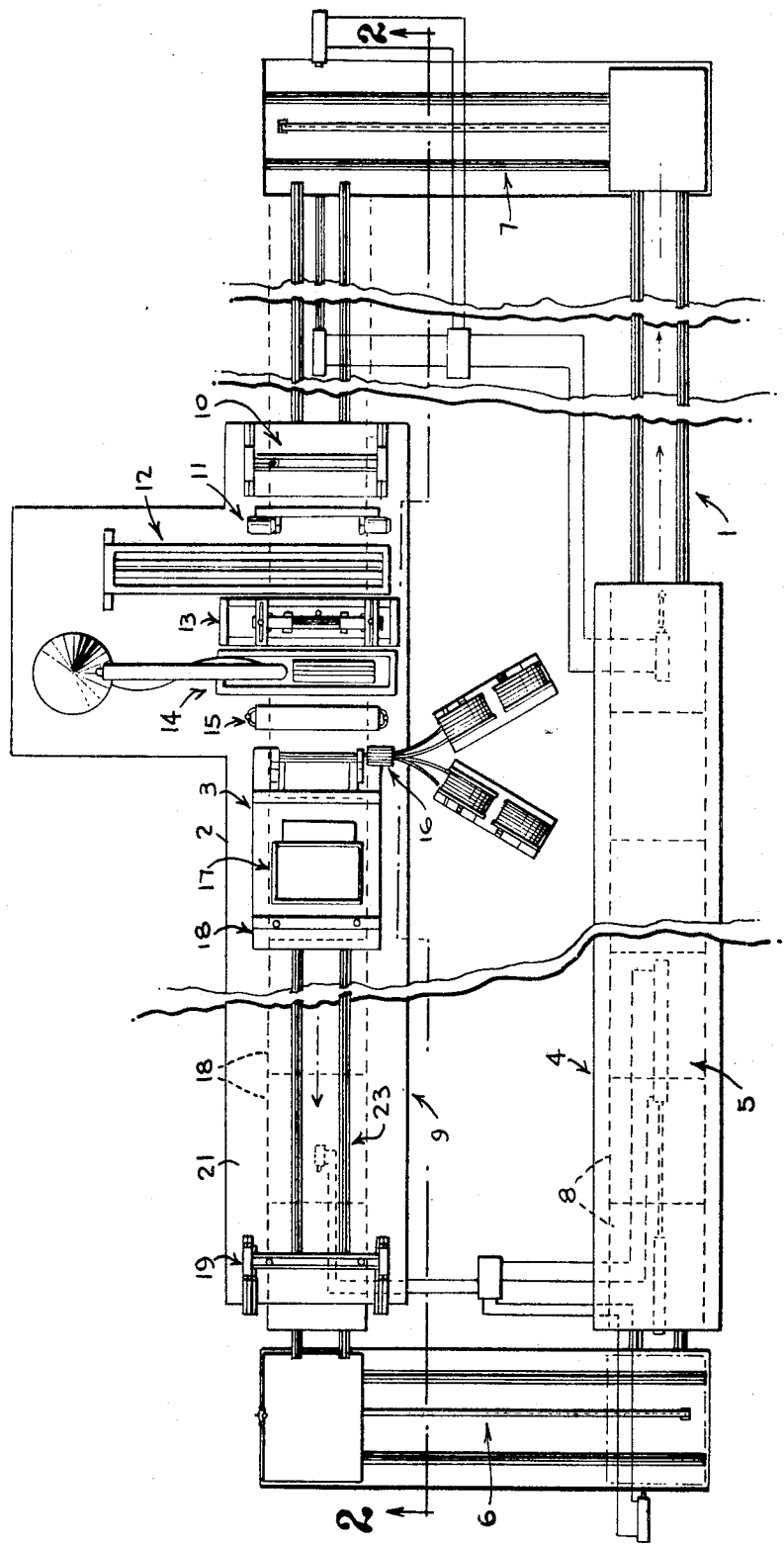
FIGURE 1 is a schematic plan view illustrating apparatus for carrying out the method of the present invention.
Figure 2D:
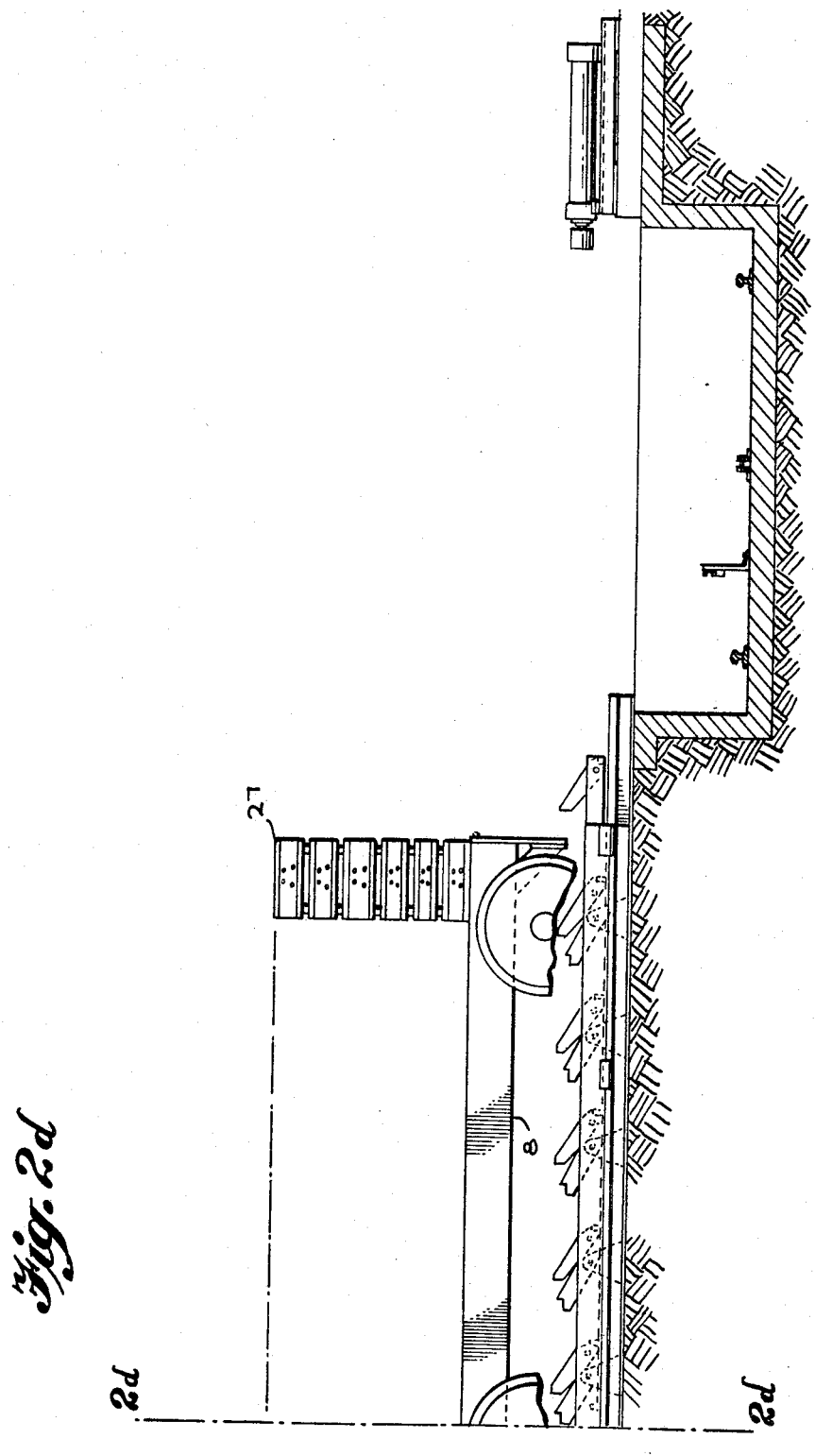
Figure 3:
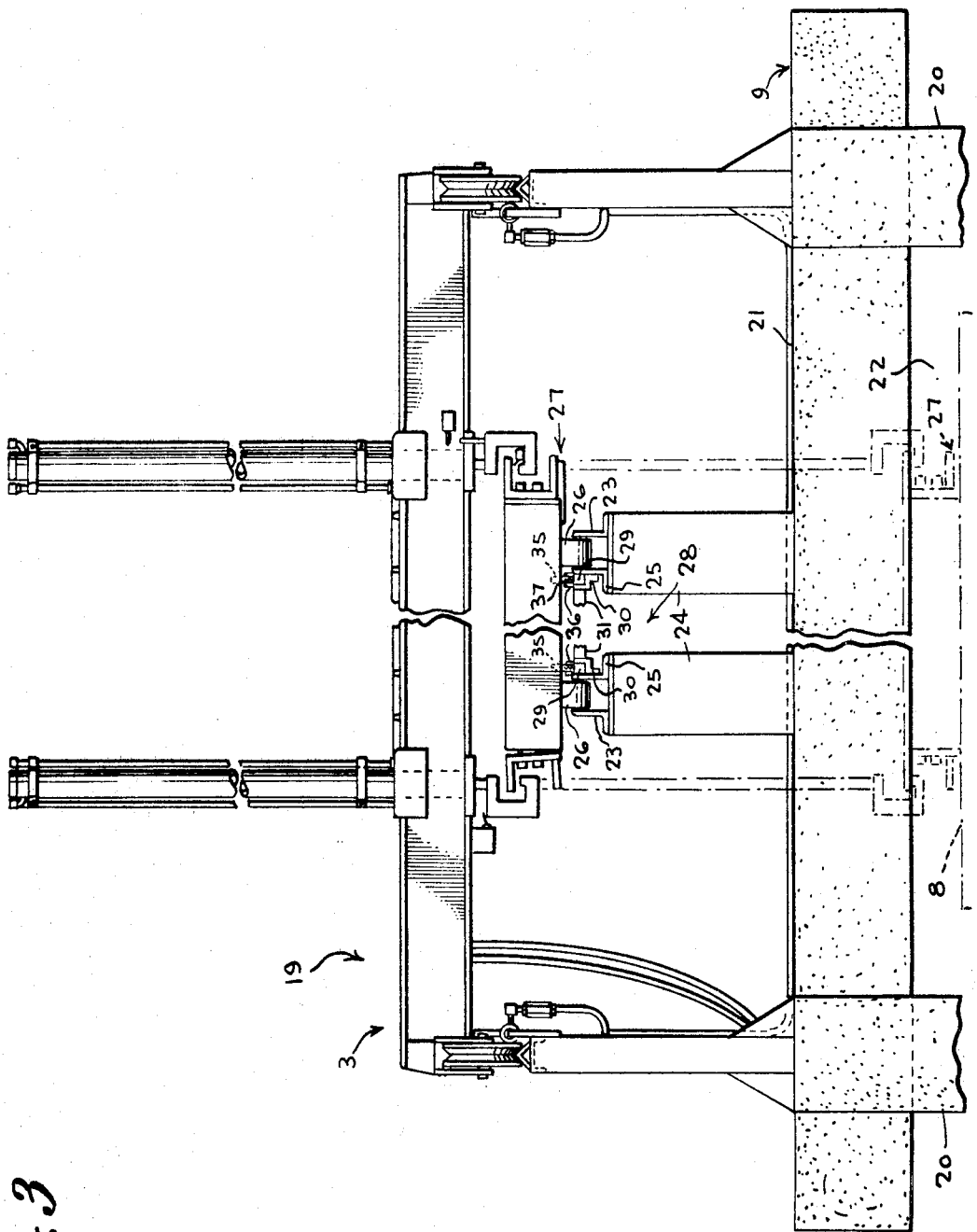
FIGURE 3 is a vertical section taken on the line 3—3 of FIGURE 2A, illustrating in elevation the means for unloading pallets from the machine and stacking them on a kiln car.

Referring to the drawings in detail, and first to FIGURE 1, there is shown diagrammatically a plan view of the entire apparatus. It consists of a rectangular orbit, or path, 1 for a pallet transporting means. The transporting path includes a leg 2 along and above which a concrete member forming machine 3 is located, and a parallel leg 4, substantially the whole length of which is enclosed by curing tunnel 5. Connecting the ends of the legs 2 and 4, and completing the orbit, are transfer pits 6 and 7, along which transporting cars 8 are shifted from the forming machine leg of the orbit to the tunnel leg 4, and from the tunnel leg to the forming machine leg.

The tunnel 5 may be a conventional curing tunnel having appropriate heating means to provide the necessary curing atmosphere for the concrete members. As the tunnel structural detail forms no part of the present invention, it has not been illustrated, and will not be described.

The concrete member forming machine has a base 9 (see FIGURES 2A, 2B, 2C, 2D and 3) forming a bridge over the leg 2 of the transport path, and a platform, upon which various stations, where the several required operations are performed, are located. These include (starting at the right end of the machine as shown in FIGURES 2A, 2B, 2C and 2D) a pallet receiving station 10, a cable cutting station 11, a concrete member removal station 12, a pallet header cleaning station 13, pallet cleaning station 14, an anchor inserting station 15, a cable laying station 16, a stressing station 17, a molding and vibrating station 18, and a loaded pallet delivery station 19.

The base 9 is formed of a pair of longitudinally extending, horizontally spaced, vertical walls, or legs, 20, and a flat platform 21 rests upon the tops of the legs. The legs, and a portion of the platform which bridges the legs, form the tunnel 22, through which the transporting kiln cars 8 move. The platform is sufficiently broad to project some disstance beyond the legs on either side of the tunnel. It is upon this platform that the various operating stations of the machine are mounted.

When pallets are placed upon the machine, they are loaded upon a pallet track 23 (see FIGURES 2A, 2B, 2C, 2D and 3) which extends the full length of the platform 21. The track is supported upon pedestals 24, arranged in two parallel rows extending longitudinally of the platform, and horizontally spaced angle irons 25 which are supported in pairs on the tops of the pedestals. The angle irons are mounted in horizontally spaced position, and each pair provides a mounting means for the axles of track roller 26. Rollers 26 are located closely adjacent to one another between the respective pairs of the angle irons, to provide two rolling surfaces along transversely spaced lines to support the pallets, and permit them to be moved with little effort along the full length of the machine.

Pallets 27 are moved along the pallet track in predetermined increments, and in predetermined spaced relation, by means of pallet-advancing racks 28. These racks comprise elongated bars 29 which extend the length of the tracks, and are supported for longitudinal reciprocating movement in brackets 30 mounted on the pedestals 24. The bars are interconnected by a bridge 31 having a depending arm 32 coupled to a hydraulic cylinder operating assembly 33 anchored to a fixed bracket 34. The hydraulic unit is a double-acting one and it will be operative to shift the pallet-advancing racks rearwardly and then forwardly. Each of the rack bars is provided with a plurality of pallet-engaging dogs 35 (see FIGURES 2B and 3) adapted to abut the rear edges of the several pallets and move them forward. The dogs are pivotally attached to the racks as at 36, and each dog is urged, by means of a spring 37, to its raised, pallet-engaging position. As the racks move rearwardly, the dogs can depress passing under the next succeeding pallet and, when they clear the rear edge of the pallet, spring up into engaging relation with the pallet. On the advancing movement of the racks the pallet will be moved with the rack the full distance of the advancing step. The dogs will be arranged to hold the pallets normal to the track direction.

When a pallet 27 containing a cured concrete article is placed upon the machine leg 3, at the entrance end 10, it will seat upon the pallet track 23 and be moved along the machine leg of the unit in equal increments by means of the pallet-advancing racks 28. A pallet will come first to the cable cutting station 11, where the cables are cut free from the pallet so as to release their tension to the concrete article and free the article from connection to the pallet. On the next movement of the racks 28, the pallet will be moved to the member removing station 12 where the concrete member is separated from the pallet, inverted and positioned for removal from the machine. The pallet then moves to the station 13 where the cut ends of the cable are removed from the anchors in the pallet headers, where upon the pallet travels to the station 14 where it is cleaned. Next, the racks move the pallet to the station 15 where new anchors are inserted preparatory to stringing fresh cable across the pallet. The pallet-advancing racks 28 move again and transfer the pallet from the station 15 to the cable laying station 16. At this station, the cables are inserted through the openings in the pallet headers and across the pallet in desired pattern, and then the cables are cut to proper length. At this station, the cables are not stressed but they are held rather tautly in place. Upon successive movements of the racks 28, the pallet is brought to the stressing station 17 where a jack separates the pallet heads to stress the cables. The pallet is so constructed that the stressed cables will be held tensioned throughout the remainder of the molding and curing process. The pallet with its tensioned cables is then transported to the molding station 18 where the actual pouring, shaping, compressing and vibrating operations take place. After this, the pallet is ready for removal from the machine. In the embodiment of the apparatus shown, the pallet is transferred automatically onto cars which carry it through the curing tunnel and back to the entrance end of the machine leg of the unit.

It will be seen that the present method provides a series of steps by which pallets can be moved to various stations to receive their stressing cables, have them stressed and the concrete member poured and shaped in the pallet. This provides a method for rapid manufacture of prestressed articles in a pallet which will contain the article and hold the cables stressed so that the pallet with its finished article can be removed from the machine for curing. The provision of the subsequent steps of cutting the cables and removing the cured articles from the pallets at separate stations enables a continuation of the free flowing manufacturing line.

While in the above one practical embodiment of the invention has been disclosed, it will be understood that the specific order of procedures are merely illustrative of the method of the present invention, and the method may be performed in other successions of steps within the scope of the appended claims.

What is claimed is:

1. A method of forming stressed concrete articles in a pallet comprising, moving the pallet along a path to a cable laying station, laying cable across the pallet, moving the pallet to a cable stressing station, stressing cables and holding the cables stressed by anchoring the stressed cable ends to the pallet, moving the pallet to a molding station, pouring concrete on the pallet about the stressed cables, and compressing and vibrating the concrete on the pallet, and removing the pallet with the formed article from the path.

2. A method of forming stressed concrete articles as claimed in claim 1 with the further steps of moving a pallet with a cured article to an article removing station, cutting the stressed cables free from the pallet, removing the article from the pallet, moving the pallet to a cleaning station, cleaning the pallet, and repeating this cycle of steps.

3. A method of forming stressed concrete articles as claimed in claim 2 wherein, the cured article is formed inverted and is turned at the removing station.

References Cited

UNITED STATES PATENTS

| | | | |
|---|---|---|---|
| 3,006,053 | 10/1961 | Miller | 25—41.7 |
| 2,821,005 | 1/1958 | Davis | 25—41.7 |
| 2,787,041 | 4/1957 | Pettipiece | 25—2 |
| 1,632,286 | 6/1927 | Graham. | |
| 3,305,907 | 2/1967 | Baker | 25—2 |

FOREIGN PATENTS 647,780   7/1952   Great Britain.

ROBERT F. WHITE, Primary Examiner

RICHARD H. SHEAR, Assistant Examiner

U.S. Cl. X.R.

264—71, 228